(No Model.) 3 Sheets—Sheet 1.
J. P. KETTERINGHAM.
HATCHWAY.
No. 403,196. Patented May 14, 1889.
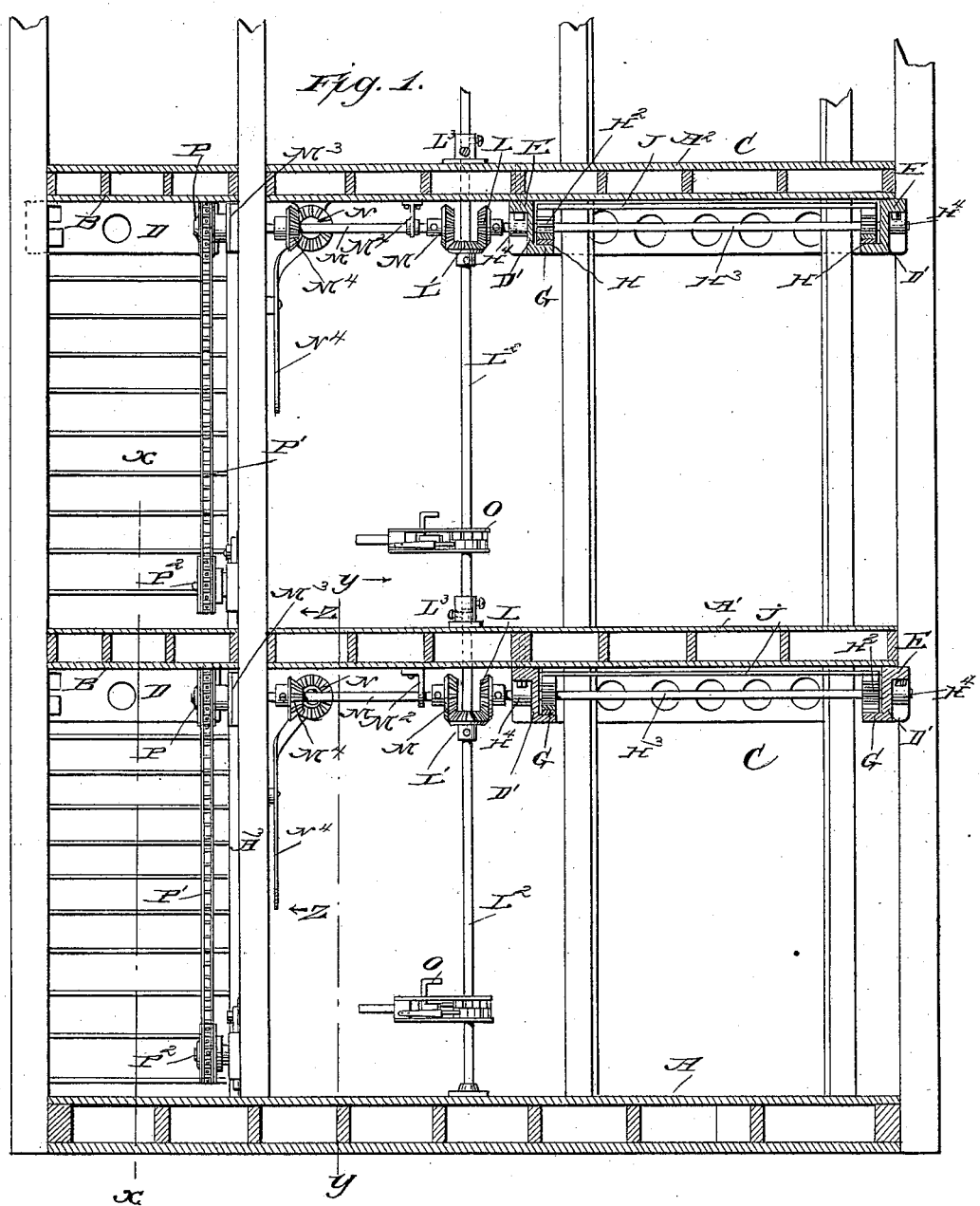
WITNESSES:
W. R. Davis
C. Sedgwick
INVENTOR
J. P. Ketteringham
BY Munn & Co
ATTORNEYS.

(No Model.)  3 Sheets—Sheet 2.
J. P. KETTERINGHAM.
HATCHWAY.
No. 403,196. Patented May 14, 1889.
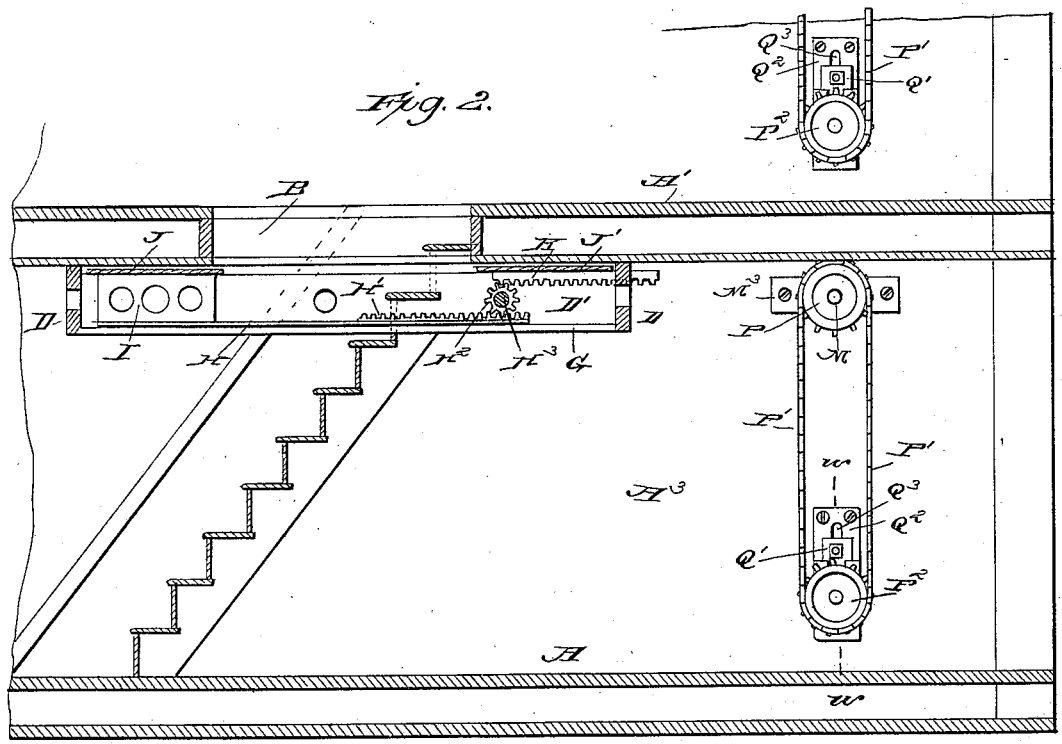
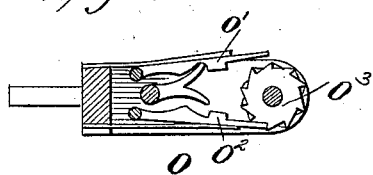
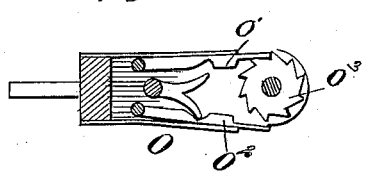
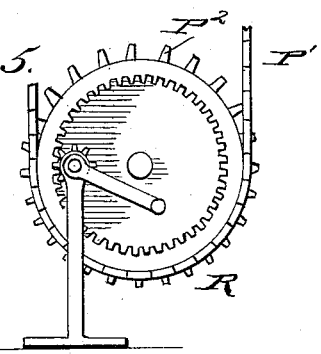
WITNESSES:
N. R. Davis
C. Sedgwick
INVENTOR.
J. P. Ketteringham
BY
Munn & Co
ATTORNEYS.

(No Model.) 3 Sheets—Sheet 3.
J. P. KETTERINGHAM.
HATCHWAY.
No. 403,196. Patented May 14, 1889.
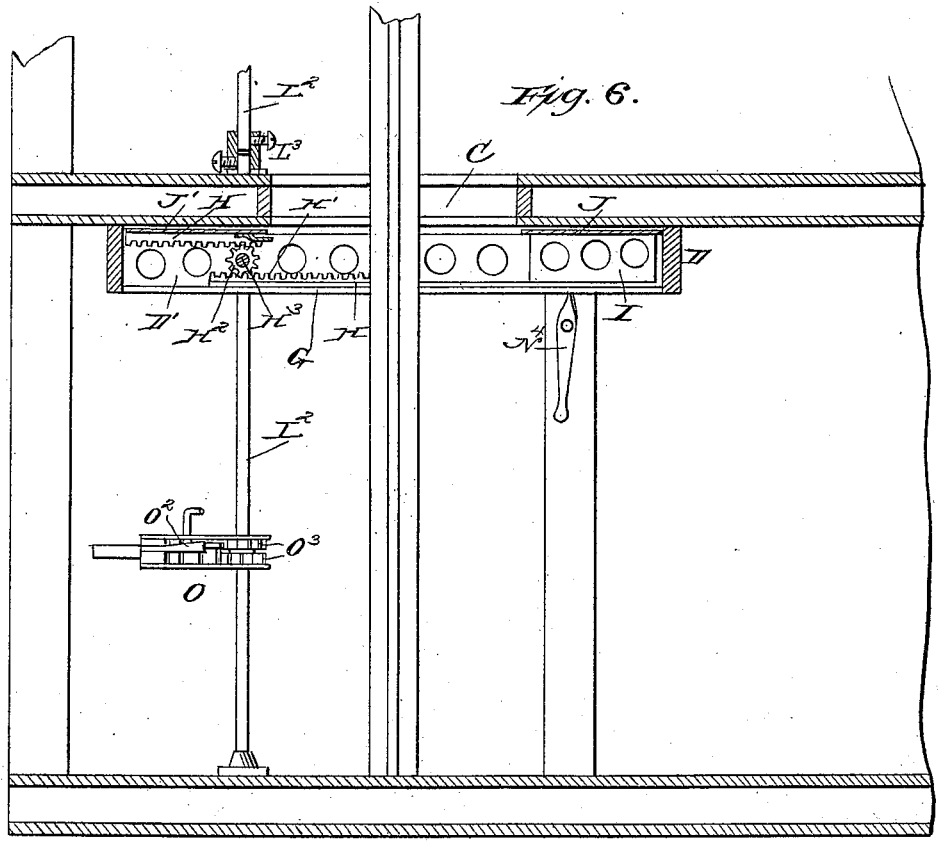
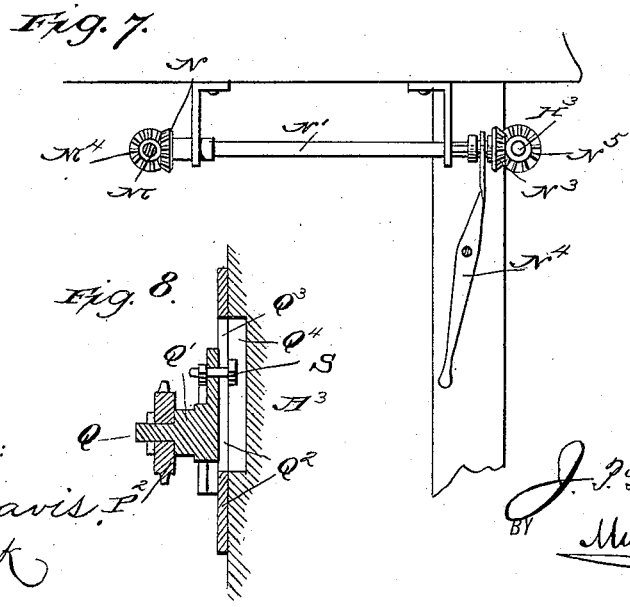
WITNESSES:
W. R. Davis
C. Sedgwick
INVENTOR,
J. P. Ketteringham
BY Munn & Co.
ATTORNEYS.

UNITED STATES PATENT OFFICE.

JOHN P. KETTERINGHAM, OF NATCHEZ, MISSISSIPPI, ASSIGNOR OF ONE-HALF TO STEPHEN DUNCAN, OF SAME PLACE.

HATCHWAY.

SPECIFICATION forming part of Letters Patent No. 403,196, dated May 14, 1889.

Application filed May 29, 1888. Renewed April 10, 1889. Serial No. 306,754. (No model.)

*To all whom it may concern:*

Be it known that I, JOHN PALMER KETTERINGHAM, of Natchez, in the county of Adams and State of Mississippi, have invented a new and useful Improvement in Draft Cut-Offs for Hatchways, of which the following is a full, clear, and exact description.

This invention relates to means for closing the stair and elevator hatchways of buildings to cut off draft communication between the different floors, so that in case of fire its rapid spreading will be prevented.

The object of the invention is to provide for the ready application of the draft cut-off to existing buildings, and to secure greater simplicity and efficiency than has been heretofore generally attained in devices of the kind.

Reference is to be had to the accompanying drawings, forming a part of this specification, in which similar letters of reference indicate corresponding parts in all the figures.

Figure 1 is a transverse sectional elevation of a part of a building to which a draft cut-off embodying my invention has been applied. Fig. 2 is a longitudinal sectional elevation of a part of the same on the line $x\ x$ of Fig. 1. Figs. 3, 4, and 5 are detail views of parts hereinafter referred to. Fig. 6 is a longitudinal sectional elevation on the line $y\ y$, Fig. 1. Fig. 7 is a longitudinal sectional elevation on the line $z\ z$, Fig. 1; and Fig. 8 is a detail cross-sectional elevation on the line $w\ w$, Fig. 2.

The floors A A' A² of the building thus illustrated are provided with vertically-aligned stair-hatchways B and elevator-shaft hatchways C, the stair-hatchways B being located in the hallways at one side of each floor, and the elevator-hatchways C at the opposite side of each floor.

To the ceiling around each of the hatchways B and C is fitted and secured a rectangular frame, D, preferably of iron, the side plates, D', and end plates of which depend from the ceiling, the side plates, D', being formed at their upper edges with outwardly-projecting flanges E, which are bolted to the ceiling and to the floor-joists thereabove, as clearly shown in Fig. 1. The opposite side plates, D', of each frame D are also formed on their lower edges with inwardly-projecting guide-rails G, on which are mounted to slide lengthwise thereof straight bars H, on the front ends of which are fixed upwardly-projecting blocks I, made in skeleton form for the sake of lightness.

On the opposite blocks, I, are fixed the respective ends of a door-section, J, working in close relation to the ceiling, the construction and arrangement being such that on sliding the connected bars H forward the door-section J will cover one-half the hatchway, and on sliding the bars H in the opposite direction the door-section J will be retracted beneath the ceiling at the corresponding end of the hatchway, and the latter thus left open. The other ends of the bars H extend beneath the ceiling at the opposite end of the hatchway, and are formed on their upper faces with corresponding series of rack teeth, H', which are engaged by corresponding pinions, H², fixed on a shaft, H³, mounted transversely across, and in bearings H⁴, formed on the outside of the respective side plates, D', of the frame D. The tops of the pinions H² are also engaged by series of teeth formed on the under side of corresponding rack-bars, K, on the tops of which are fixed the corresponding ends of an opposite door-section, J', which is arranged to close the corresponding half of the hatchway and to be retracted beneath the ceiling at the end thereof in a manner similar to the opposite door-section, J. With this arrangement, when either shaft H³ is turned in one direction, the door-sections J J' will be brought to a meeting at the middle of the hatchway, so as to tightly close the same and cut off the draft, and when the shaft H³ is turned in the opposite direction the door-section will be retracted simultaneously beneath the respective part of the ceiling, and the hatchway thus fully opened.

On the outer projecting ends of the shafts H³, in the elevator hatchway-frames D, on all the stories of the building, are fixed bevel-gears L, which are engaged respectively by bevel-gears L', fixed on a single operating-shaft, L², extending vertically through the several stories of the building. The respective bevel-gears L' are also engaged by bevel-gears M on the ends of short horizontal shafts M', each of which is journaled in a hanger, M², depending from the ceiling, and in a bearing, $M^3$, attached to the outside of the partition-wall $A^3$, separating the main part of the respective story from the hallway in which the stairs are located, through which partition $A^3$ the shaft $M'$ extends.

On each shaft $M'$, inside the partition $A^3$, is fixed a bevel-gear, $M^4$, which is engaged by a bevel-gear, N, on a counter-shaft, $N'$, journaled in hangers along the inside of the respective partition $A^3$, and carrying on its opposite end a bevel-gear, $N^3$, which is mounted to slide thereon, but compelled to turn therewith by means of a common feather and groove, as shown in Fig. 7. The bevel-gear $N^3$ is arranged to be either engaged with or disengaged from, by a shifting-lever, $N^4$, a bevel-gear, $N^5$, which is fixed on the shaft $H^3$, mounted in the frame D of the respective stair-hatchway B, the said shaft $H^3$ projecting inward through the side plate, $D'$, of the frame D and through the partition $A^3$, for gearing with the said counter-shaft $N'$. With this arrangement, on properly turning the vertical shaft $L^2$, the counter-shafts $N'$ being all in gear with the respective door-operating shafts $H^3$ of the stair-hatchways B, all the hatchways B and C can be either closed or opened simultaneously at will, and any of the stair-hatchway doors can be thrown out of gear, so as not to be operated with the remainder, on disengaging the proper bevel-gears $N^3$ $N^5$ by means of the shifting lever or levers $N^4$.

On the vertical shaft $L^2$, at each story, is fixed a reverse ratchet-lever, O, (shown most clearly in Figs. 3 and 4,) so constructed that when swung in the horizontal plane the shaft $L^2$ can be made to be rotated thereby in either direction on engaging the proper pawl, $O'$ or $O^2$, carried by said lever, with the ratchet-wheel $O^3$ on the shaft. Thus all the hatchways B C can be opened or closed simultaneously from the main apartment of any story of the building by a single operator.

On the ends of all the horizontal shafts $M'$ projecting through the partition $A^3$ into the respective hallways near the ceiling, as before described, are fixed sprocket or band wheels P, over each of which runs an endless chain or band, $P'$, to and around a loose sprocket-wheel, $P^2$, which is mounted to turn near the floor on a stud, Q, projecting from a bearing, $Q'$, attached to the partition $A^3$, so that all the hatchways can be closed simultaneously from the hallway on any story by an operator properly drawing on the respective chain $P'$.

In some cases each sprocket-wheel $P^2$ may be provided with a crank-gear arrangement, R, like that shown in Fig. 5, for operating the endless chain in lieu of drawing upon it by hand.

Each bearing Q is mounted to slide vertically on a plate, $Q^2$, which is bolted or otherwise attached to the inside of the partition $A^3$, and is provided with a vertical slot, $Q^3$, behind which a recess, $Q^4$, is formed in the partition, and through which and the bearing $Q'$ is passed the shank of a headed screw-bolt, S, on the outer end of which is screwed a binding-nut, so that the bearing $Q'$ can be adjusted to put the proper amount of tension on the chain $P'$, and then locked in such position.

The main vertical shaft $L^2$ is formed in sections corresponding to the several floors of the building, and joined at each floor by detachable couplings $L^3$, which serve also as bearings for the shaft-sections, so that on disconnecting the proper couplings the hatchway-doors on any of the floors may be operated without affecting the others.

It is evident that where the hatchways are of varying lengths door-operating gears must be employed of correspondingly-different sizes, so as to effect the simultaneous closing of all the hatchways.

The entire arrangement thus described is readily applicable to existing buildings without need of injuring the same, and at comparatively slight expense.

Having thus described my invention, what I claim as new, and desire to secure by Letters Patent, is—

1. The combination, with the rectangular frame D, constructed to be attached to the ceiling around a hatchway, and having opposite and inwardly projecting guide-rails G, of rack-bars sliding on said guideways, a cut-off door secured to the said bars, a transverse shaft journaled in the frame, and pinions on the said shaft meshing with the said rack-bars, substantially as described.

2. The combination, with the floor of a building having a hatchway, of plates $D'$, depending from the ceiling on opposite sides of the hatchway and having parallel inward-projecting guide-rails G, a pair of rack-bars, H, having their teeth on their upper faces mounted to slide on the respective rails G and carrying one door-section, pinions $H^2$, engaging the respective rack-bars, a transverse shaft, $H^3$, carrying the pinions, another pair of rack-bars, K, having their teeth on their lower faces riding on the pinions $H^2$ and carrying the opposite door-section, and means for rotating the shaft $H^3$, substantially as described.

3. The combination, with the floor of a building having a hatchway, of plates $D'$, depending from the ceiling beneath said floor on opposite sides of the hatchway, and formed with shaft-bearings $H^4$ $H^4$ and parallel inwardly-projecting guide-rails G, bars H, mounted to slide lengthwise on the respective rails G, having elevated supports I on one end carrying a door and rack-teeth $H'$ on their other ends, pinions $H^2$, engaging the respective rack-teeth $H'$, a shaft, $H^3$, carrying the pinions $H^2$ and journaled in the bearings $H^4$, and means for rotating the shaft $H^3$, substantially as described.

4. The combination, with a building having hatchways, of sliding cut-off doors for the respective hatchways, a transverse shaft, $H^3$, across each hatchway, and gearing for operating the said cut-off doors therefrom, a vertical shaft, $L^2$, extending through the several floors of the building, gearing connecting the shaft $L^2$ with each of the shafts $H^3$, and a reverse ratchet-lever for turning the shaft $L^2$ in either direction, substantially as described.

5. The combination, with a building having a hatchway, of cut-off doors for the hatchway, a transverse shaft across the hatchway, gearing for operating the doors from the said shaft, sprocket-wheels, endless chains or bands passing over the said sprocket-wheels, and intermediate gearing between one of the sprocket-wheels and the said transverse shaft, substantially as herein shown and described.

6. The combination, with a building having hatchways B C and sliding sectional doors J J' for each hatchway, provided with racks, of the transverse shafts H, provided with the pinions engaging the said racks and with bevel gear-wheels, the vertical shaft $L^2$, provided with bevel gear-wheels, the horizontal shaft M', provided with bevel gear-wheels on its ends, the counter-shaft N', provided with bevel gear-wheels, and means for operating the shaft $L^2$, substantially as herein shown and described.

JOHN P. KETTERINGHAM.

Witnesses:
ALLISON H. FOSTER,
ARCHEY P. WILLIAMS.